(No Model.)
W. M. WELLING.
BRUSH OR MIRROR BACK.
No. 467,268. Patented Jan. 19, 1892.
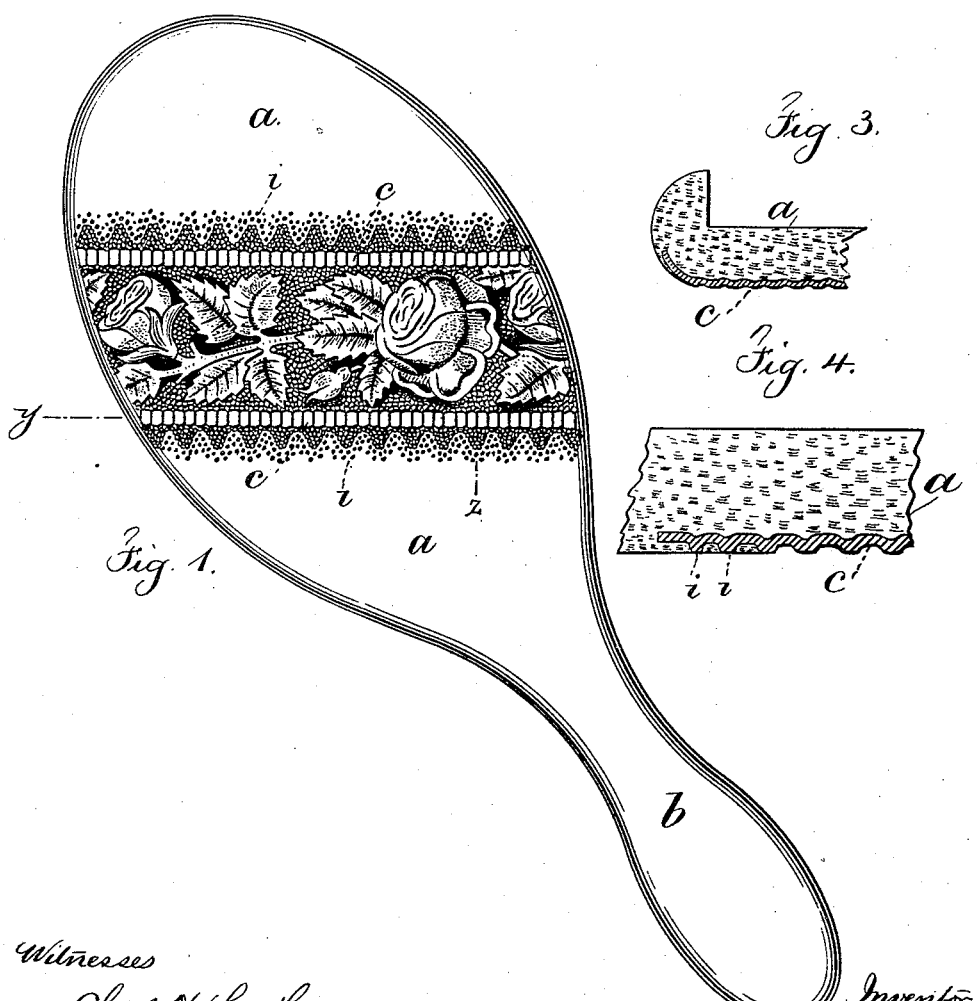

UNITED STATES PATENT OFFICE.

WILLIAM M. WELLING, OF NEW YORK, N. Y.

BRUSH OR MIRROR BACK.

SPECIFICATION forming part of Letters Patent No. 467,268, dated January 19, 1892.

Application filed April 27, 1891. Serial No. 390,603. (No model.)

*To all whom it may concern:*

Be it known that I, WILLIAM M. WELLING, a citizen of the United States, residing in the city and State of New York, have invented an Improvement in Brush and Mirror Backs or Similar Articles, of which the following is a specification.

Backs and handles for mirrors and brushes have been made of composition resembling ivory, the same being molded in a heated condition within dies and under a heavy pressure, and such articles have been either plain or more or less ornamented.

In the manufacture of album-covers, boxes, and other articles ornaments have been employed, the same being of thin sheet metal embossed, and usually the metal has been plated and colored in imitation of oxidized-silver plate. These ornaments are often very artistic; but they are not adapted to being fastened to the surfaces of brush or mirror backs or similar articles after the article is made, because the edges, corners, and sometimes the angles of the embossed work become caught in the hair, flesh, or clothing.

My invention relates to the method of manufacturing the articles, and also to the peculiarity in the article itself, as hereinafter set forth.

In the drawings, Figure 1 is a representation of the brush-back or similar article, and Fig. 2 is a section of the dies as ready to receive the plastic material. Figs. 3 and 4 are sections of the brush-back in larger size at the lines $y$ and $z$, respectively.

I refer to my patent, No. 5,940, granted June 30, 1874, for a description of a composition that may be made use of in making the brush-back or other article; but I remark that any composition or material that is adapted to being pressed into shape between dies while such material is in a plastic or soft condition may be employed in connection with this invention.

I make use of thin sheet-metal ornaments that are embossed to the desired ornamental pattern, and they may be plated or otherwise ornamented in imitation of oxidized silver or of other precious metal, and these ornaments may be separate or cut off in lengths from an ornamental ribbon.

The drawings represent a composition brush or mirror back $a$, having a handle $b$ and an ornamental sheet-metal strip $c$, passing diagonally across the back.

In making the brush-back or other article suitable dies are prepared for receiving and pressing the artificial ivory or other plastic composition. I have shown the bottom die $e$ recessed at 2 and the top die $f$ recessed for the edge that surrounds the mirror or the brush-block. The thin sheet-metal ornament $c$ is inserted into the bottom die and placed in the desired position, and then the plastic material in the proper condition is laid into the bottom die over the sheet-metal ornament $c$, and a heavy pressure is employed to close the dies $e f$ and give shape to the articles. In thus applying the pressure a peculiar operation takes place. The ornament that is embossed raises the edges of the sheet metal from the bottom die sufficiently for the plastic material to squeeze in a very little and thus cover and surround the edges of the sheet metal and hold the same firmly into the plastic composition. The principal pressure against the plastic material causes the same to fill the cavities at the back of the sheet-metal ornament or strip, and in so doing the plastic material and the metal are further united, and the pressure tends to flatten out the embossing, so that the figure is reduced to a low and almost smooth relief. This enhances the beauty of the article, as well as rendering the metal smooth and free from projections, and as the metal dies are necessarily smooth the high parts of the design are smoothed or polished by the pressure in such a manner that the beauty of the design is enhanced.

I find it advantageous to have a background or border to the sheet metal of numerous raised dots, as shown at $i$, in order that the plastic compound may freely be squeezed around them by the pressure, and the visible ends of these raised dots form a contrast of polished dots to the surrounding imitation ivory.

In cases where embossed and ornamented metal has been used with a plastic composition the metal has been held to the composition by hooks or projections and the composition did not pass around and lap over the edges of the metal so as to cover such edges, as in my improvement.

I claim as my invention—

1. The brush-back or similar article of a plastic composition, with an embossed sheet-metal ornament in the composition material, with the highest parts of its surface level with the surface of the composition, and such composition extended over the edges of the sheet metal and retaining the same, substantially as set forth.

2. The method herein specified of manufacturing composition articles with inlaid ornaments, consisting in placing in a mold an embossed piece of thin sheet metal, placing thereon composition material in a plastic condition and pressing the parts of the mold together and simultaneously shaping the article, partially flattening the embossed sheet metal and smoothing its highest parts, and causing the composition to adhere to the metal and to press around its edges, substantially as set forth.

Signed by me this 22d day of April, 1891.

W. M. WELLING.

Witnesses:
   GEO. T. PINCKNEY,
   WILLIAM G. MOTT.